United States Patent
Gassmann et al.

(10) Patent No.: US 9,643,490 B2
(45) Date of Patent: May 9, 2017

(54) DRIVE ASSEMBLY WITH ELECTRIC MACHINE AND MOTOR VEHICLE HAVING SUCH A DRIVE ASSEMBLY

(71) Applicant: GKN Driveline International GmbH, Lohmar (DE)

(72) Inventors: Theodor Gassmann, Siegburg (DE); Michael Schwekutsch, Wermelskirchen (DE); Mark Schmidt, Konigswinter (DE)

(73) Assignee: GKN Driveline International GmbH, Lohmar (DE)

( * ) Notice: Subject to any disclaimer, the term of this patent is extended or adjusted under 35 U.S.C. 154(b) by 134 days.

(21) Appl. No.: 14/375,577

(22) PCT Filed: Feb. 1, 2013

(86) PCT No.: PCT/EP2013/052094
§ 371 (c)(1),
(2) Date: Jul. 30, 2014

(87) PCT Pub. No.: WO2013/113907
PCT Pub. Date: Aug. 8, 2013

(65) Prior Publication Data
US 2015/0021112 A1    Jan. 22, 2015

(30) Foreign Application Priority Data
Feb. 2, 2012    (DE) .................... 10 2012 100 865

(51) Int. Cl.
*B60K 5/02*        (2006.01)
*B60K 6/48*        (2007.10)
(Continued)

(52) U.S. Cl.
CPC .............. *B60K 17/354* (2013.01); *B60K 5/02* (2013.01); *B60K 6/48* (2013.01); *B60K 6/52* (2013.01);
(Continued)

(58) Field of Classification Search
CPC ... B60K 5/02; B60K 6/48; B60K 6/52; B60K 6/54; B60K 17/34; B60K 17/348;
(Continued)

(56) References Cited

U.S. PATENT DOCUMENTS 4,405,029 A * 9/1983 Hunt ........................ B60K 6/24
                                                      180/303
4,804,061 A * 2/1989 Kameda ............. B60K 17/3467
                                                      180/247
(Continued)

FOREIGN PATENT DOCUMENTS

DE           199 19 454 A1      11/2000
DE      10 2005 042 352          3/2007
(Continued)

OTHER PUBLICATIONS

PCT International Search Report (PCT/EP2013/052094) dated Mar. 27, 2013 (3 pages).

*Primary Examiner* — Joseph Rocca
*Assistant Examiner* — Maurice Williams
(74) *Attorney, Agent, or Firm* — Bejin Bieneman PLC

(57) ABSTRACT

The invention elates to an electric drive assembly for a multi-axle driven motor vehicle which comprises an internal combustion engine, a multi-step transmission with an output shaft for driving a rear axle, as well as an optionally driveable front axle. The drive assembly comprises an electric machine (6), a reduction gearing (7) drivingly connected to the electric machine (6), a driveshaft (9) drivingly connected to the reduction gearing (7) and drivingly con-
(Continued)

nectable to a front propeller shaft (65) for driving the front axle, and a housing 5 in which the electric machine (6) and the reduction gearing (7) are arranged. The housing (5) comprises connecting means (16) for connecting the drive assembly (2) to the multi-step transmission. The electric drive assembly is designed such that, with the electric drive assembly mounted at the multi-step transmission (56), a rear propeller shaft (57) can be connected at least indirectly to the output shaft of the multi-step transmission for driving the rear axle. Furthermore, the invention relates to a motor vehicle with such a driveline assembly.

14 Claims, 7 Drawing Sheets

(51) Int. Cl.
*B60K 6/52* (2007.10)
*B60K 6/54* (2007.10)
*B60K 17/348* (2006.01)
*B60K 17/354* (2006.01)
*B60K 17/356* (2006.01)
*B60W 10/08* (2006.01)

(52) U.S. Cl.
CPC .............. *B60K 6/54* (2013.01); *B60K 17/348* (2013.01); *B60K 17/356* (2013.01); *B60K 2006/4833* (2013.01); *B60W 10/08* (2013.01); *Y02T 10/6221* (2013.01); *Y02T 10/6265* (2013.01)

(58) Field of Classification Search
CPC ..... B60K 17/354; B60W 10/08; B60W 10/11; B60W 10/111
See application file for complete search history.

(56) References Cited

U.S. PATENT DOCUMENTS

| | | | | |
|---|---|---|---|---|
| 4,874,056 A * | 10/1989 | Naito | ................ | B60K 23/0808 180/233 |
| 4,967,869 A * | 11/1990 | Nagaoka | ............ | B60K 23/0808 180/197 |
| 5,132,908 A * | 7/1992 | Eto | .................... | B60K 23/0808 180/197 |
| 5,183,131 A * | 2/1993 | Naito | ................ | B60K 23/0808 180/233 |
| 5,332,059 A * | 7/1994 | Shirakawa | ............. | B60K 23/04 180/197 |
| 5,902,205 A * | 5/1999 | Williams | ........... | B60K 17/3467 180/248 |
| 5,967,251 A * | 10/1999 | Turl | ..................... | B60K 5/1241 180/297 |
| 6,857,985 B2 * | 2/2005 | Williams | ................. | B60K 6/38 180/65.25 |
| 2003/0104892 A1 * | 6/2003 | Porter | ..................... | B60K 6/26 475/5 |
| 2005/0109550 A1 * | 5/2005 | Buglione | ................. | B60K 6/26 180/65.25 |
| 2006/0113127 A1 | 6/2006 | Dong et al. | | |
| 2007/0034427 A1 * | 2/2007 | Janson | ................... | B60K 6/365 180/65.22 |
| 2007/0034471 A1 * | 2/2007 | Asano | ...................... | B60K 6/52 192/48.6 |
| 2008/0318720 A1 * | 12/2008 | Fukuda | ................. | B60K 6/365 475/5 |
| 2009/0186734 A1 * | 7/2009 | Perkins | .................. | B60K 6/442 475/5 |
| 2009/0223725 A1 | 9/2009 | Rodriguez et al. | | |
| 2011/0000721 A1 | 1/2011 | Hassett et al. | | |
| 2011/0079454 A1 * | 4/2011 | Maguire | ................ | B60K 6/442 180/65.25 |
| 2011/0087410 A1 * | 4/2011 | Cimatti | ................ | B60K 17/35 701/60 |
| 2011/0094809 A1 * | 4/2011 | Poschmann | .............. | B60K 1/02 180/65.225 |
| 2011/0118915 A1 * | 5/2011 | Ortmann | ................... | B60K 6/48 701/22 |
| 2011/0125353 A1 * | 5/2011 | Komeda | ................ | B60K 6/387 701/22 |
| 2011/0126652 A1 * | 6/2011 | Genise | ..................... | B60K 6/12 74/329 |
| 2011/0276241 A1 * | 11/2011 | Nakao | .................... | B60K 6/445 701/69 |
| 2012/0004072 A1 * | 1/2012 | Ogawa | ................ | B60K 17/348 476/67 |
| 2012/0065017 A1 * | 3/2012 | Yamada | ................ | B60K 6/365 475/5 |
| 2012/0100955 A1 * | 4/2012 | Sakagami | .............. | B60K 17/35 476/61 |
| 2012/0116624 A1 * | 5/2012 | Reith | ........................ | B60K 6/48 701/22 |
| 2012/0137681 A1 * | 6/2012 | Hoess | ....................... | B60K 6/48 60/607 |
| 2012/0304789 A1 * | 12/2012 | Misu | ...................... | B60K 6/547 74/331 |
| 2012/0318099 A1 * | 12/2012 | Hayashi | ................... | B60K 6/48 74/661 |
| 2013/0012347 A1 * | 1/2013 | Ortmann | ................... | B60K 6/442 475/5 |
| 2013/0035818 A1 * | 2/2013 | Meitinger | .............. | B60K 6/448 701/22 |
| 2013/0066529 A1 * | 3/2013 | Murayama | .............. | F16H 61/12 701/62 |
| 2013/0211640 A1 * | 8/2013 | Maier | .................... | B60K 6/448 701/22 |
| 2013/0332015 A1 * | 12/2013 | Dextreit | ................. | B60K 6/448 701/22 |
| 2013/0345011 A1 * | 12/2013 | Yoshimura | ........... | B60K 17/348 475/198 |
| 2014/0200111 A1 * | 7/2014 | Murakami | ............... | B60K 6/48 477/4 |
| 2014/0235402 A1 * | 8/2014 | Matsubara | ............... | B60K 1/00 477/8 |

FOREIGN PATENT DOCUMENTS

| | | |
|---|---|---|
| DE | 10 2006 046 419 | 5/2008 |
| DE | 10 2008 037 886 | 2/2010 |
| DE | 10 2009 034 586 | 1/2011 |

* cited by examiner

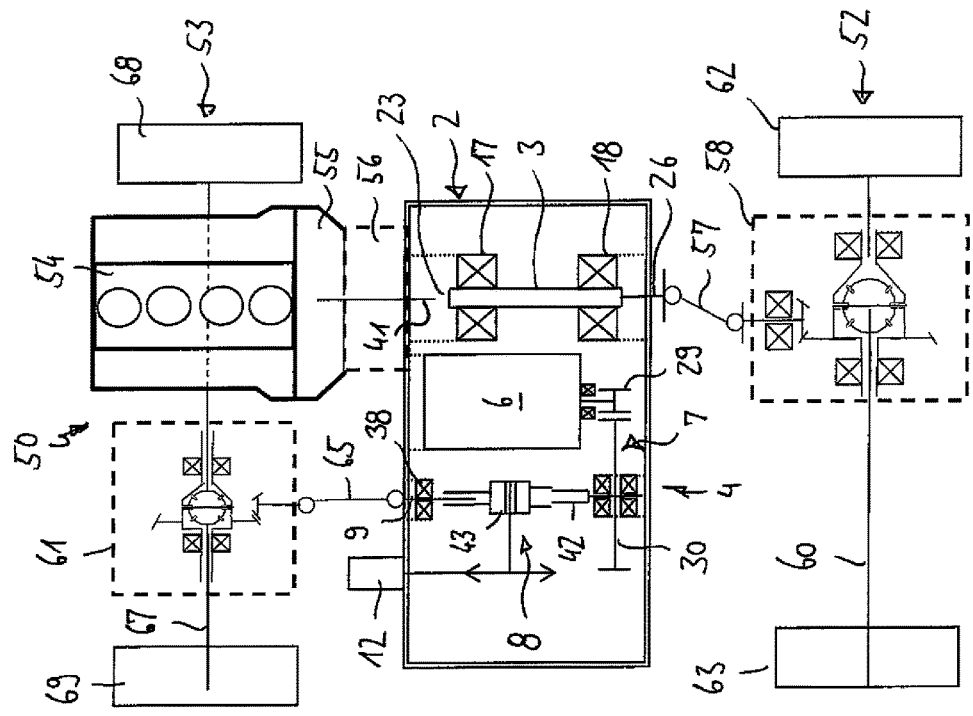
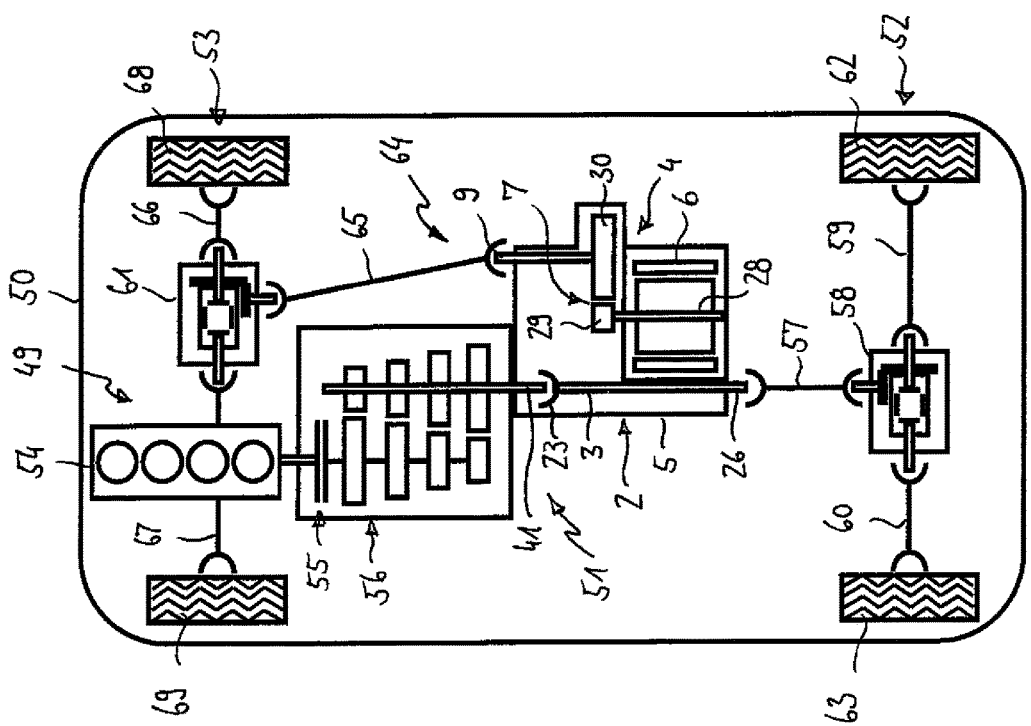
Fig. 5
Fig. 4

DRIVE ASSEMBLY WITH ELECTRIC MACHINE AND MOTOR VEHICLE HAVING SUCH A DRIVE ASSEMBLY

CROSS-REFERENCE TO RELATED APPLICATION

This application claims priority to, and is a National Phase of International Application No. PCT/EP2013/052094, filed on Feb. 1, 2013, which claims priority to German Application No. 10 2012 100 865.5, filed on Feb. 2, 2012, which applications are hereby incorporated by reference in their entirety.

BACKGROUND

An advantage of a hybrid drive in a vehicle is that an internal combustion engine can be operated in an advantageous efficiency range more frequently and for longer periods of time. When the vehicle is accelerated, the internal combustion engine and an electric machine can be operated jointly. During braking and during coasting of the vehicle, part of the braking energy can be recovered and stored in an energy accumulator. More particularly in urban traffic and during downhill driving, energy recovery contributes towards a reduction in fuel consumption. If no or only a small amount of driving power is required, the internal combustion engine can be switched off completely. This can be the case during coasting, under stationary conditions or when driving at low speed (e.g. when parking the vehicle) with a charged accumulator.

Usually, the internal combustion engine is drivingly connected to a multi-step transmission that transmits torque generated by the internal combustion engine to the driveline. In the case of motor vehicles driven by a rear axle only, the torque is transmitted by the multi-step transmission via a propeller shaft to a rear axle differential drive. The rear axle differential drive distributes the introduced torque to two output shafts for driving the wheels, with the two output shafts having a differential effect relative to one another, i.e., if one of the two output shafts rotates more quickly, the other one of the two output shafts rotates correspondingly more slowly, and vice versa. In the case of all-wheel drive motor vehicles, a central differential is connected downstream to the multi-step transmission so as to transmit part of the introduced torque to the rear axle and part of the torque to the front axle.

From DE 199 19 454 A1, a motor vehicle drive assembly is known with an internal combustion engine, a gear changing assembly and an electric machine. Via a cardan shaft, the internal combustion engine drives the rear wheels. The electric machine can be drivingly connected to the front wheels via a separating coupling and a driveshaft. The rotor of the electric machine is connected to the separating coupling via a connecting drive.

US 2006/0113127 A1 proposes a hybrid motor vehicle with an internal combustion engine, an electric main motor and an electric auxiliary motor. The electric main motor is arranged at the rear end of the multi-step transmission, with the output shaft of the electric main motor being drivingly connected to the output shaft of the multi-step transmission. The electric auxiliary motor is arranged so as to adjoin the internal combustion engine and is connected via a belt drive to the crankshaft. The two electric machines are each connected to a battery.

From DE 10 2008 037 886 A1, a drive assembly is known for a motor vehicle driven by a plurality of axles. The drive assembly comprises a transfer case which transmits torque introduced by a drive unit to a rear driveline and a front driveline. The rear driveline is permanently drivingly connected to the transfer case to be able to permanently transmit torque to the rear axle. The front driveline is optionally drivingly connected to the transfer case to transmit torque to the front axle.

Especially in the case of rear axle driven motor vehicles with a longitudinally arranged internal combustion engine, integrating an electric machine for a hybrid drive is frequently complicated because of the limited installation space available. In addition, there may be a need for expensive re-designing processes to be carried out on fixed components to which the hybrid drive has to be attached, as a result of which the number of variants and related costs are increased.

SUMMARY

Disclosed herein is an electric drive assembly for a multi-axle driven motor vehicle, more particularly for a motor vehicle with a longitudinally installed internal combustion engine, which electric drive assembly has a compact design and can easily be integrated into the available installation space. Furthermore, a multi-axle driven motor vehicle comprises such an electric drive assembly.

The electric drive assembly for a multi-axle driven motor vehicle comprises two drive sources. Drive concepts with two drive sources are also referred to as hybrid drives, and motor vehicles equipped accordingly are also referred to as hybrid vehicles. An internal combustion engine is generally provided as a first drive source and an electric machine as a second drive source. The internal combustion engine and the electric machine can each drive the motor vehicle on its own or jointly when superimposed on one another.

An electric drive assembly is provided for a multi-axle driven motor vehicle, generally a four-wheel driven motor vehicle that comprises an internal combustion engine, a multi-step transmission with an output shaft for driving a rear axle, and a selectively driveable front axle, said electric drive assembly comprising an electric machine, a reduction gearing drivingly connected to the electric machine, a driveshaft which is drivingly connected to the reduction gearing and which can be connected to a front propeller shaft for driving the front axle, and a housing in which the electric machine and the reduction gearing are arranged, wherein the housing comprises at least one element for connection to the housing to the multi-step transmission, wherein the electric drive assembly is designed such that, with the electric drive assembly mounted at the multi-step transmission, a rear propeller shaft can be connected at least indirectly to the output shaft of the multi-step transmission for driving the rear axle. In the present case, the term "drivingly connected" is to include the possibility of said elements being drivingly connectable to one another, for instance by a coupling arranged within the driveline.

The electric drive assembly can also be easily integrated into existing motor vehicle concepts with a longitudinally installed internal combustion engine and a primarily driven rear axle. For this purpose, the drive assembly, which can also be referred to as a hybrid gearbox or a hybrid drive, can be accommodated in the installation space which, otherwise, in motor vehicle models with an all-wheel drive, is used for a transfer case or an all-wheel drive. The drive assembly can be connected to the housing of the multi-step transmission via suitable connecting element(s), for example via flanged or bolted connections. It is thus possible to use the connecting regions, respectively the attaching points, of the transfer case which are otherwise used for an all-wheel drive. This is advantageous in that there is no need for any design changes of the motor vehicle architecture, of the multi-step transmission or of the connecting element(s), which has an advantageous effect on design and production. It is to be understood that the multi-step transmission, which can also be referred to as the main transmission, can be provided in the form of an automatic or a manual transmission, depending on requirements. A further advantage is that the electric machine and the reduction gearing are integrated into a common housing. Both components form a unit with a compact design. By arranging both components jointly in one single housing a lightweight unit is achieved and in addition it is possible to reduce production and assembly costs.

Preferably, the electric drive assembly is configured such that, i.e., comprises means configured such that, with the electric drive assembly mounted to the multi-step transmission, the rear propeller shaft can be at least indirectly drivingly connected to the output shaft of the multi-step transmission. In other words, the propeller shaft can be connected to the transmission shaft for torque transmitting purposes in a condition, when the electronic drive assembly has already been mounted to the multi-step transmission.

According to a first embodiment, the means comprised in the electric drive assembly can comprise a through-driveshaft for transmitting torque through the housing. In this case, the propeller shaft is drivingly connected to the multi-step transmission indirectly via the through-driveshaft. The through-driveshaft is supported in the housing so as to be rotatable around an axis of rotation. At one end, the through-driveshaft comprises an input part for being drivingly connected to the output shaft of the multi-step transmission. At the other end, the through-driveshaft comprises an output part for being drivingly connected to the rear propeller shaft. Integrating the electric drive and the through-drive in a common housing is particularly advantageous in view of the size of the installation space of the unit. Between the through-drive and the active parts of the electric machine there is only the wall of the electric machine, so that the electric machine can be arranged closely to the through-drive. This advantageously affects the size of the assembly so that it thus becomes possible to arrange the assembly in this location (instead of a transfer case), i.e. in the power path behind, respectively downstream, the multi-step transmission. In the region of the input part, the through-driveshaft is rotatably supported in the housing by means of a first bearing, and more particularly, it is proposed to arrange the first bearing so as to be axially offset away from a first end face of the electric machine. If the electric machine is installed with a forwardly pointing shaft journal, the first bearing preferably overlaps with the shaft journal. In the region of the output part, the through-driveshaft is rotatably supported in the housing by means of a second bearing, with the second bearing preferably being axially offset away from a second end face of the electric machine.

Depending on the installation space conditions, the means comprised in the electric drive for effecting a driving connection between the propeller shaft and the multi-step transmission with the electric drive assembly being mounted to the multi-step transmission, could also be provided in a form which differs from a through-driveshaft. For instance, said mechanism could be provided in the form of annular or C-shaped fixing arm or bracket of the housing. The fixing arm can be firmly connected to the housing of the multi-step transmission via the fixing means. In this embodiment, the propeller shaft has to be connected directly to the output of the multi-step transmission, with the propeller shaft extending in a contact-free way relative to the fixing arm through the latter, respectively past same.

The electric machine comprises a longitudinal axis which can be defined by the axis of rotation of the shaft journal. In a preferred embodiment, the longitudinal axis of the electric machine is arranged at a distance from the axis of rotation of the through-driveshaft, more particularly in such a way that the distance between the electric machine and the through-driveshaft is as short as possible. The two axes preferably extend at least approximately parallel relative to one another. This means that said axes can extend parallel relative to one another, but they can also cross one another at a distance, wherein an angle enclosed between the axes can amount up to 10° if viewed in direction of the shortest distance between said two skew axes. Furthermore, according to an advantageous embodiment it is proposed that the longitudinal axis of the electric machine is arranged at a distance from the axis of rotation of the driveshaft. More particularly, it is proposed that the axis of rotation of the driveshaft is aligned in such a way that it is possible to achieve a rigid attachment to the front propeller shaft. In this way it is possible to do without a rotational joint, such as a universal joint, in the propeller shaft, which has an advantageous effect on costs. The axis of rotation of the driveshaft and the longitudinal axis of the electric machine can extend at least approximately parallel relative to one another, with the above definition applying in this case, too. Overall, said embodiment achieves a compact design of the electric drive assembly.

The electric machine can be operated as a motor which converts electrical energy into mechanical energy, or as a generator which converts mechanical energy into electric energy. When operating as a motor, the electric machine drives the front axle. This can be simultaneous to driving the rear axle, i.e. the front axle is driven by the electric motor at the same time as the rear axle is being driven by the internal combustion engine. This operating mode can be selected for example for accelerating the motor vehicle. However, driving the front axle by the electric motor can also take place independently of driving the rear axle, i.e. the front axle can be driven without the rear axle being driven. This operating mode can be chosen for example for parking purposes or when driving the vehicle in the so-called stop-and-go mode. When operating as a generator, the electric machine is driven by the front axle, with mechanical energy being converted into electric energy. This mode of operation can be used for example when braking the motor vehicle, so that the braking energy can be recuperated. The electric energy generated when using the electric machine as a generator is stored in an accumulator which is arranged in the motor vehicle and which is electrically connected to the electric machine. The electric machine preferably comprises a nominal voltage of a maximum of 60 volts, more particularly a nominal voltage of 48 volts. The electric machine thus advantageously comprises a compact size and it can be integrated into the onboard electric supply system of the motor vehicle.

For achieving a rapid and variable control of the electric machine and optimum adaptation of the performance characteristics of the electric machine to the required axle moments, it is advantageous to provide an externally controllable coupling in the driveline between the electric machine and the front axle. In this way, the torque braking moment transferable to the front axle can be controlled in accordance with requirements. The coupling may be arranged inside the housing of the electric drive assembly, either in the power path between the electric machine and the reduction gearing or between the reduction gearing and the driveshaft. By the coupling, transmission of torque between the electric machine and the driveshaft can be selectively initiated or interrupted, as required. It is to be understood that, alternatively or in addition, a further coupling can be provided outside the electric drive assembly in the front driveline, for example in the front propeller shaft, at or in the front axle differential, or in one or both front axle sideshafts.

According to a further embodiment a first part of the coupling is connected in a rotationally fixed way to the output part of the reduction gearing. A second coupling part of the coupling is drivingly connected to the drive shaft of the electric drive assembly. The two coupling parts can optionally be made to engage one another or be disengaged from one another, so that the transmission of torque to the front axle can be initiated or interrupted. According to a preferred embodiment, the coupling is provided in the form of a form-locking coupling, i.e., there are provided first and second form-locking means which can be made to engage or disengage from one another. An example for a form locking coupling is a claw coupling, a toothed coupling or a dog clutch. However, it is understood that the coupling may also have a different design, for example in the form of a friction plate coupling.

The coupling may be controlled by an electronic control unit as a function of the driving condition or the driving dynamics. For actuating the coupling, there is provided an actuator which, more particularly, can be actuated electro-mechanically or electro-magnetically. However, it is also conceivable to use a pneumatic or hydraulic actuator.

The electric machine is drivingly connected to the reduction gearing or can be drivingly connected to same. The reduction gearing slows down a rotary movement generated by the electric motor, i.e. the rotational speed of the gearing output part is slower than that of the gearing input part. The reduction gearing may be provided in the form of a single-step cylindrical gearing or a beveloid gearing. In this connection, a cylindrical gearing is meant to be a gearing with cylindrical gears comprising straight toothings (spur gears) or helical toothings (helical gears). If there is an angular offset of approximately 90° between the input and the output of the gearing, a hypoid gear can also be used. It is particularly advantageous if the reduction gearing has a reduction ratio of four to six, preferably approximately five. Alternatively, the reduction gearing can also comprise a chain or belt drive with a corresponding reduction.

According to an embodiment, the housing of the electric drive assembly comprises a torque supporting means which serves to connect the electric drive assembly, respectively, the engine-transmission-unit comprising the electric drive assembly, to a stationary component, for instance the vehicle body, as well as to support the reaction moments. In addition, the torque supporting means has a damping and noise-insulating function. The torque supporting means may comprise a bushing into which a holding and damping member is inserted to be connected to the vehicle body. According to an embodiment, it is proposed that the torque supporting means and the driveshaft, in mounted condition of the electric drive assembly, are arranged at least approximately symmetrically with reference to a central longitudinal plane of the electric drive assembly. It is particularly advantageous if a first plane which is formed by the axis of rotation of the through-driveshaft and the axis of rotation of the driveshaft, and a second plane which is formed by the through-driveshaft and the axis of the torque supporting means enclose an angle of approximately 90°+15°. In this way, a compact design of the electric drive assembly is achieved, as well as a good integration into an existing vehicle architecture.

Furthermore, the above-mentioned objective is achieved by providing a multi-axle driven motor vehicle which comprises a rear axle which is driveable via a rear propeller shaft, a front axle which can be driven via a front propeller shaft, a longitudinally arranged internal combustion engine, a multi-step transmission drivingly connected to the internal combustion engine and an electric drive assembly which can be provided in the form of one or several of the above-mentioned embodiments. It is proposed that the housing of the electric drive assembly is firmly connected to a housing of the multi-step transmission via the connecting element(s), wherein the rear propeller shaft, while passing through the housing, is at least indirectly drivingly connected to the output shaft of the multi-step transmission and that the driveshaft of the electric drive assembly is drivingly connected to the front axle via the front propeller shaft.

This results in the advantages mentioned in connection with the presently disclosed electric drive assembly to which, to that extent, reference is hereby made. The electric drive assembly is designed to be compact such that it can easily be integrated into the existing motor vehicle architecture of vehicles with a longitudinally built-in internal combustion engine and a primarily driven rear axle. There is no need for any, or hardly any adaptive measures as regards interfaces between the electric drive assembly and the vehicle, which has an advantageous effect on design and production efforts and expenses. As described above, the penetration of the housing can be effected by a through-driveshaft whose input part is connected to the output shaft of the multi-step transmission and whose output part is connected to the rear propeller shaft. However, it is also possible for the propeller shaft to pass through an aperture of the housing and to be directly connected to the output shaft of the multi-step transmission.

The front axle comprises a front axle differential and two sideshafts for driving the front wheels. The front axle differential distributes a torque introduced by the front propeller shaft to the two sideshafts. For this purpose, the differential comprises an input which is drivingly connected to the propeller shaft and two outputs each of which being drivingly connected to a respective sideshaft. According to a possible embodiment at least one coupling can be arranged in the driveline between the driveshaft of the electric drive assembly and the two front wheels. By opening the at least one coupling, the rotational movement of the wheels can be disconnected from the remaining part of the driveline, so that friction losses are reduced. The coupling can be arranged inside the differential, for example between the input part (ring gear) and the differential carrier or outside the differential, for instance between an output part (sideshaft gear) and the sideshaft or in the region of the wheel hub between the sideshaft and the wheel.

According to a preferred embodiment, a reduction ratio of three to five is provided between the input and the two outputs of the differential, the advantage being that the reduction of the reduction gearing on the one hand and that of the front axle differential on the other hand can be used jointly for setting a required total reduction ratio between the rotational speed of the electric machine and the rotational speed of the front axle. For instance, it is possible to achieve a total reduction i of 18 to 22 between the electric machine and the front axle with only a single-step reduction gearing of the electric drive assembly, if the reduction ratio for the front axle differential is suitably selected. Because the reduction gearing requires only one step, it has a particularly compact shape which, in turn, has a positive effect on the size of the complete electric drive assembly.

It is particularly advantageous to use an electric machine with a nominal voltage of 60 or 48 volts, which can easily be integrated into the onboard supply system of the motor vehicle. To that extent, in addition to being used as a drive for the front axle, the electric machine can also be used as the power supply for all the electric units of the motor vehicle.

BRIEF DESCRIPTION OF THE DRAWINGS

Embodiments will be explained below with reference to the drawings, wherein:

FIG. 4 is a diagrammatic view of a motor vehicle with an electric drive assembly in a third embodiment.

FIG. 5 is a diagrammatic view of a motor vehicle with an electric drive assembly in a fourth embodiment.

FIG. 6 is a diagrammatic view of a motor vehicle with an electric drive assembly in a fifth embodiment.

FIG. 7 is a diagrammatic view of a motor vehicle with an electric drive assembly in a sixth embodiment.

DESCRIPTION OF EXAMPLE EMBODIMENTS

Figure 1A:
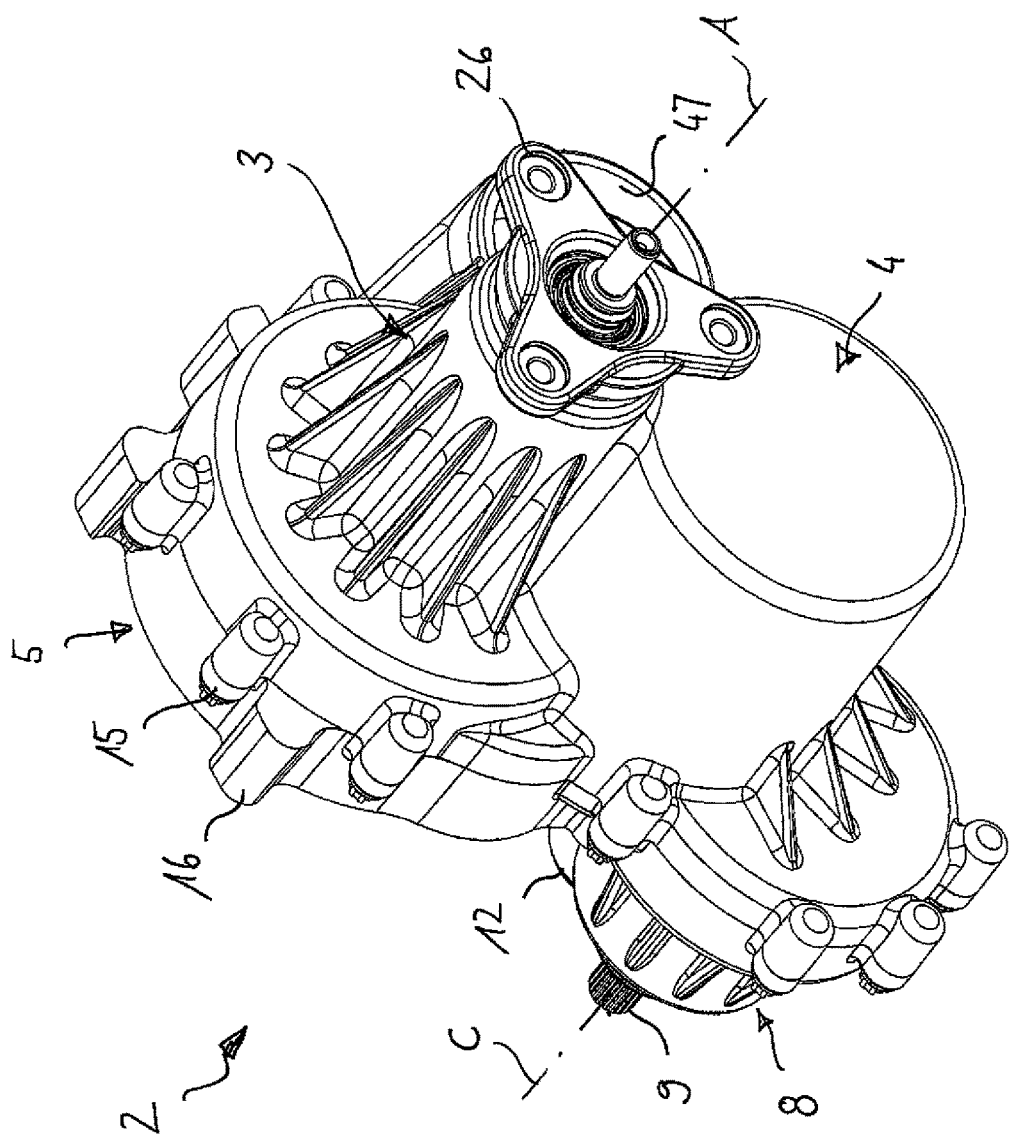
FIG. 1a shows an electric drive assembly in a first embodiment in a first perspective, in an angled view from the rear.

FIGS. 1a to 1d, which will be described jointly below, show an electric drive assembly 2. The electric drive assembly 2 can be used in a multi-axle, all-wheel driven motor vehicle (not shown here) which comprises a rear axle driven by an internal combustion engine as primary drive and a selectively driveable front axle. The rear axle is driven by a rear propeller shaft drivingly connected to a multi-step transmission of the motor vehicle. The front axle is driven via a front propeller shaft drivingly connected to the electric drive assembly 2. The electric drive assembly 2 which forms the secondary drive can be fixed to the multi-step transmission of the motor vehicle, more particularly to a rear portion of the multi-step transmission.

The electric drive assembly 2 comprises an electric machine 6, a reduction gearing 7, optionally an externally controllable coupling 8 with an actuator, as well as a driveshaft 9. Of said components, at least the reduction gearing 7 and the electric machine 6 are arranged in a common housing 5, and form a compact unit. The reduction gearing slows down the rotational movement generated by the electric machine 6, i.e., the rotational speed of the gearing output part is slower than that of the gearing input part. The electric machine 6 and the reduction gearing 7 are also jointly referred to as the electric drive 4. Furthermore, the electric drive assembly 2 comprises means 3 which are designed in such a way that, with the electric drive assembly 2 being mounted on the multi-step transmission, the rear propeller shaft can be drivingly connected to an output shaft of the multi-step transmission.

The coupling 8 serves for selectively drivingly connecting the electric machine 4 to the driveshaft 9 and, respectively, to the front axle of the motor vehicle. The coupling 8 is controlled by an electronic control unit (diagrammatically illustrated) as a function of the driving dynamics and torque requirements, respectively. For actuating the coupling 8, an actuator 12 is provided which, in the present embodiment, is provided in the form of an electro-magnetic actuator. It is understood that other types of actuators can also be used, for example electro-mechanical, pneumatic or hydraulic actuators. The coupling 8 which is controllable by the actuator 12 can be used for selectively effecting or interrupting a transmission of torque from the electric drive 4 to the front axle. To that extent, the coupling 8 acts as a so-called hang-on coupling for optionally driving the secondary front axle of the motor vehicle.

The housing 5 of the drive assembly 2 is divided into two parts and comprises a first housing part 13 and a second housing part 14 which can be connected to one another by suitable bolting connections 15. The joining plane of the two housing parts 13, 14 intersects the axis of rotation A of the through-drive 3 and the axis of rotation C of the driveshaft 9. As a result, it is possible to mount said components axially. The second housing part 14 comprises an attachment means 16 which, for example, can be provided in the form of flange projections and which are configured so as to be connected to the multi-step transmission of the motor vehicle via suitable bolted connections. The mounted condition of the electric drive assembly 2 being fixed to the multi-step transmission 56 is shown in FIGS. 2 to 6. For sealing the joining region between the multi-step transmission and the rotating components, a sealing ring 21 is provided which, in the mounted condition, is in sealing contact with the respective sealing face of the multi-step transmission 56. Because the drive assembly 2 being firmly connected to the multi-step transmission 56, said two machine elements, jointly with the internal combustion engine and the main coupling, form a common drive unit. For connecting said unit to a body part, only one of the two machine elements, either the multi-step transmission 56 or the drive assembly 2, needs to comprise an attaching means.

The above-mentioned means 3 which permits the propeller shaft to be drivingly connected to the multi-step transmission, with the drive assembly 2 being mounted on the multi-step transmission, are provided in the form of a through-driveshaft. The through-driveshaft 3 is rotatably supported in the housing 5 and serves to transmit torque from the multi-step transmission to the propeller shaft. For supporting the driveshaft 3 in the housing 5, a first bearing 17 is provided near the input, and a second bearing 18 is provided near the output. Said first and second bearings 17, 18 define an axis of rotation A. For sealing the annular chambers formed between the through-driveshaft 3 and the housing 5, there are provided shaft sealing rings 19, 20.

At a first end 22 which can also be referred to as input side end, the through-driveshaft 3 comprises an input part 23 provided for introducing torque. The input part 23 comprises a bore with an inner splined profile 24. A shaft journal comprising a respective outer splined profile can be inserted into the inner splined profile 24 in a rotationally fixed way. It is to be understood that said rotationally fixed connection of the driveshaft 3 with an attaching component represents only one of many conceivable possibilities. In addition to a toothed or splined connections in the case of which the shaft profile and the hub profile can also be kinematically reversed, any other out-of-round insertable profiles, or also flanged and bolted connections, are suitable.

At the second end 25, which can also be referred to as an output side end, the through-driveshaft 3 comprises an output part 26, which is provided in the form of a flange element. The flange element 26 is connected to the through-driveshaft 3 in a rotationally fixed and axially secured manner. The rotationally fixed connection is effected via splines 27, but in this case, too, any other connecting mechanisms are conceivable. The flange element 26 serves for connecting a propeller shaft (not illustrated here) via which torque is transmitted to a rear axle differential. Again, it is understood that the output part 26, respectively the connection to the propeller shaft, can be provided in other forms, as already explained with regard to the input part.

The electric machine 6 is received in the housing 5 so as to adjoin the through-driveshaft 3, with the gap between an outer face of the through-driveshaft 3 and an outer face of the electric machine 6 being kept small, so that the electric drive assembly 2, as a whole, having a compact radial size. The first and the second bearing 17, 18 for supporting the through-driveshaft 3 are axially offset relative to the active part of the electric machine 6, which has a space saving effect on the assembly. The first bearing 17 at least partially axially overlaps with the driving journal 28 and with the reduction gearing 7 respectively. It can be seen that the axis of rotation B of the electric machine 6 extends at least approximately in parallel to the axis of rotation A of the through-driveshaft 3.

A pinion 29 is secured so as to be rotationally fixed and axially secured on the driving journal 28 of the electric machine 6. The pinion 29 engages the gear 30 which comprises a greater diameter and a larger number of teeth than the pinion 29. The pinion 29 and the gear 30 jointly form the reduction gearing 7. It is understood that instead of the cylindrical gearing, it is also conceivable to use a different reduction unit such as a chain or belt drive.

The gear 30 is supported in a sleeve projection 33 of the housing 5 via a bearing 32 so as to be rotatable around an axis of rotation C. The gear 30 comprises a stepped through-bore 34 in which the driveshaft 9 is rotatably supported. To achieve rotatable supporting conditions between a cylindrical outer face of the driveshaft 9 and a cylindrical inner face of the gear 30, there is provided a sliding bush 35. The driveshaft 9, at its end proximate to the electric motor 6, comprises a radially outwardly projecting flange portion 36 which is axially supported against a supporting face 37 of the gear 30. Between the flange portion 36 and the supporting face 37 friction-reducing means can be provided such as a suitable coating or a sliding disc. In the region of its free end, the driveshaft 9 is rotatably supported around the axis of rotation C by a bearing 38 and is sealed relative to the housing 5 by means of a sealing ring 39.

The coupling 8 is provided in the form of a form-locking coupling and comprises a first coupling part 42 which is produced so as to be integral with a hub 31 of the gear 30, as well as a second coupling part 43 which is arranged on the driveshaft 43 in a rotationally fixed and axially displaceable way. The hub 31 of the gear 30 can also be referred to as output part of the gearing 7. The first coupling part 42 and the second coupling part 43 each comprise claws which, for torque transmitting purposes, can be made to engage one another and which can be disengaged from one another for the purpose of opening the coupling. For opening and closing the coupling 8, the second coupling part 43 can be axially moved on the driveshaft 9 towards the first coupling part 42 or away from same. A splined connection or toothed connection 44 is provided for effecting a rotationally fixed and axially displaceable connection between the second coupling part 43 and the driveshaft 9.

As already mentioned above, there is provided an actuator 12 for actuating the coupling 8. In the present embodiment, the actuator 12 is provided in the form of an electromagnetic actuator and it is electrically connected to an electronic control unit (not illustrated) of the motor vehicle. By controlling the actuator 12 by means of the electronic control unit (ECU), a shift-fork 45, which engages a respective circumferential groove 46 of the coupling part 43, can be selectively moved axially away from or towards the actuator 12. In this way, the coupling part 43 is moved axially, so that the claws of the two coupling parts 42, 43 are engaged or disengaged relative to on another.

In the closed condition of the coupling 8 there is produced a driving connection between the front axle and the electric machine 6. In this condition, the electric machine 6 is able to drive the front axle of the motor vehicle (motor-operated mode) or it can be driven by the front axle for converting mechanical energy into electrical energy (generator-operated mode).

Figure 1B:
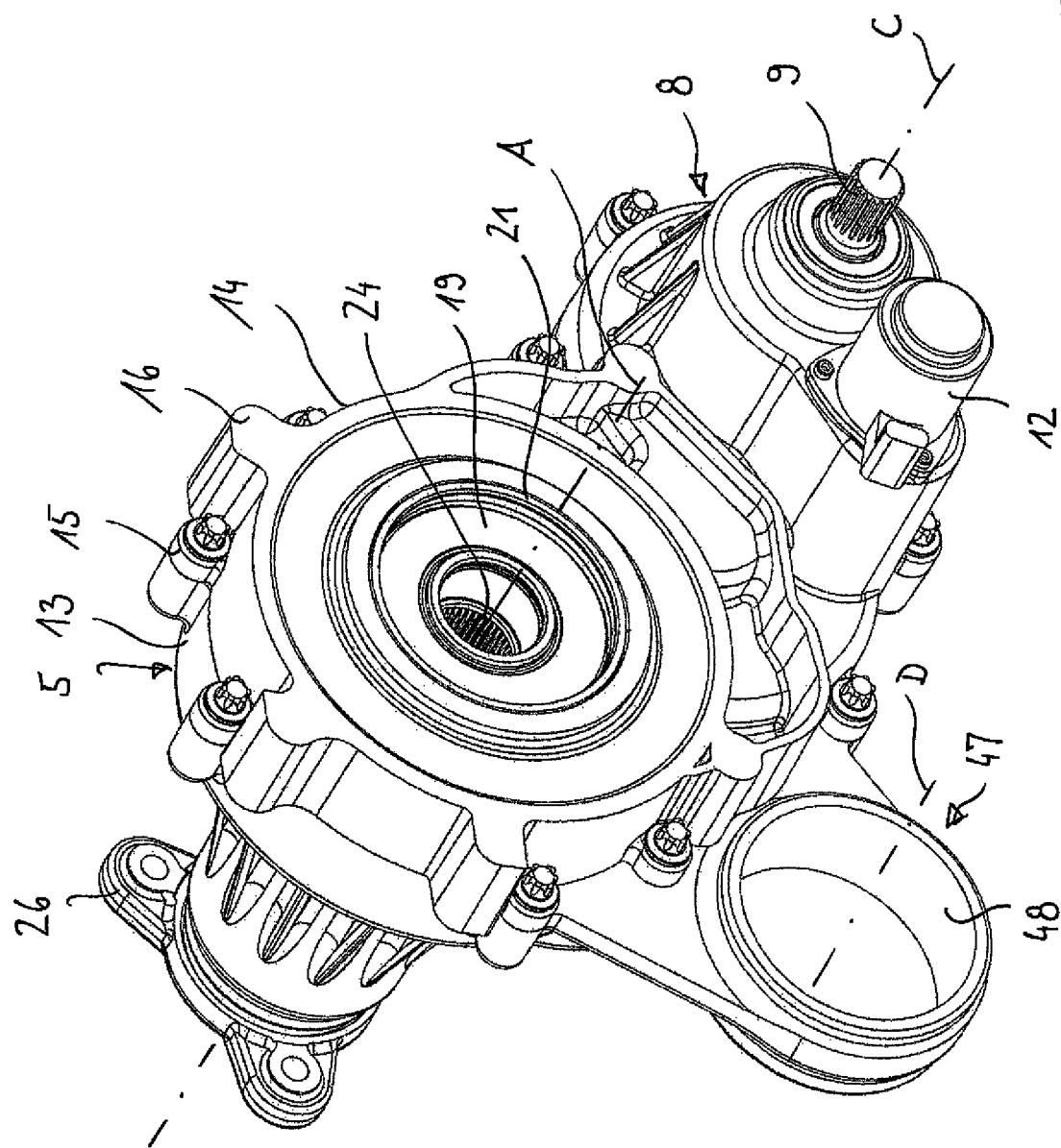
FIG. 1b shows the electric drive assembly of FIG. 1a in a second perspective, in an angled view from the front.
Figure 1C:
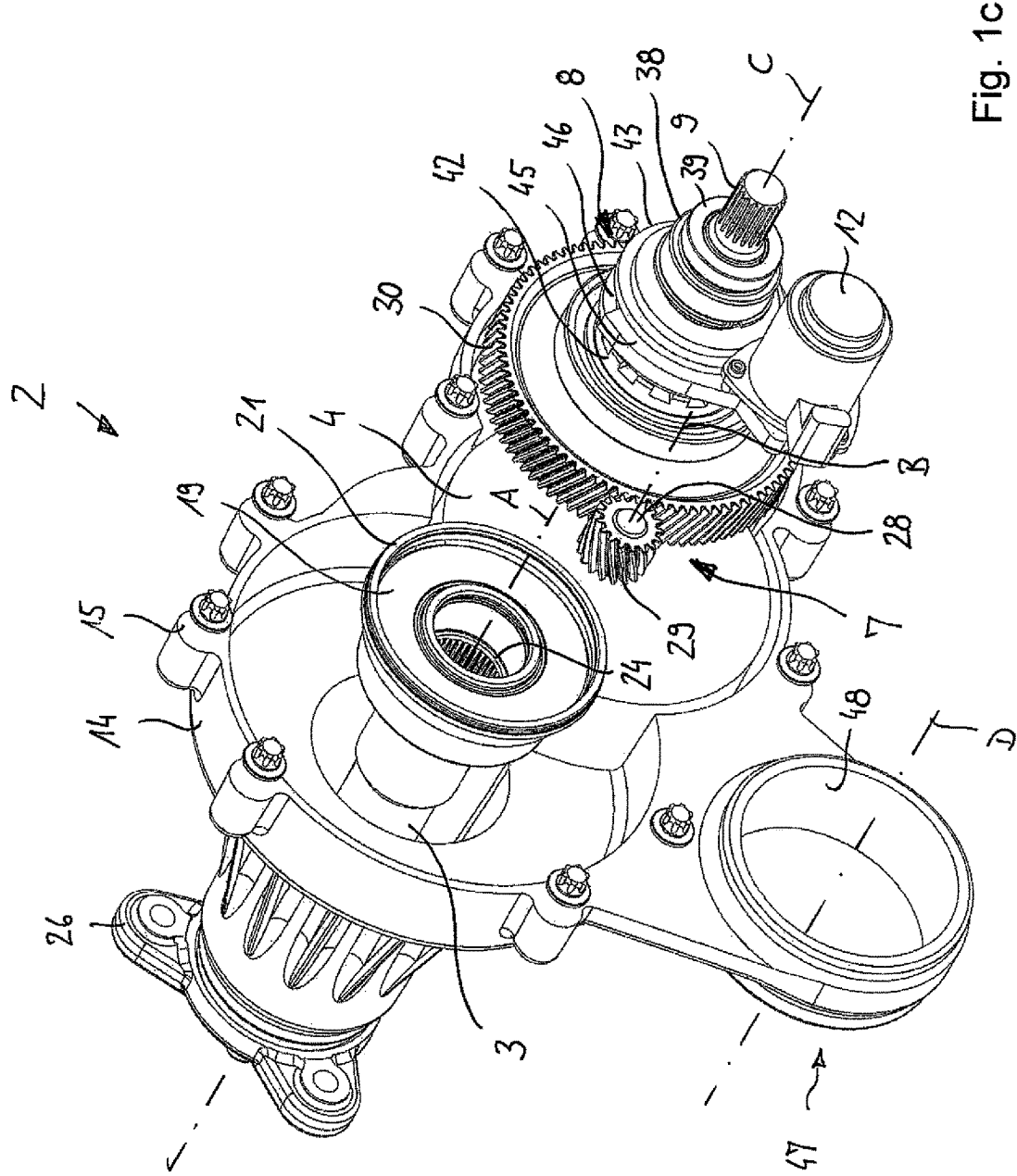
FIG. 1c shows the electric drive assembly of FIG. 1a in a perspective view similar to that of FIG. 1b, with a cut-away housing part.
Figure 1D:
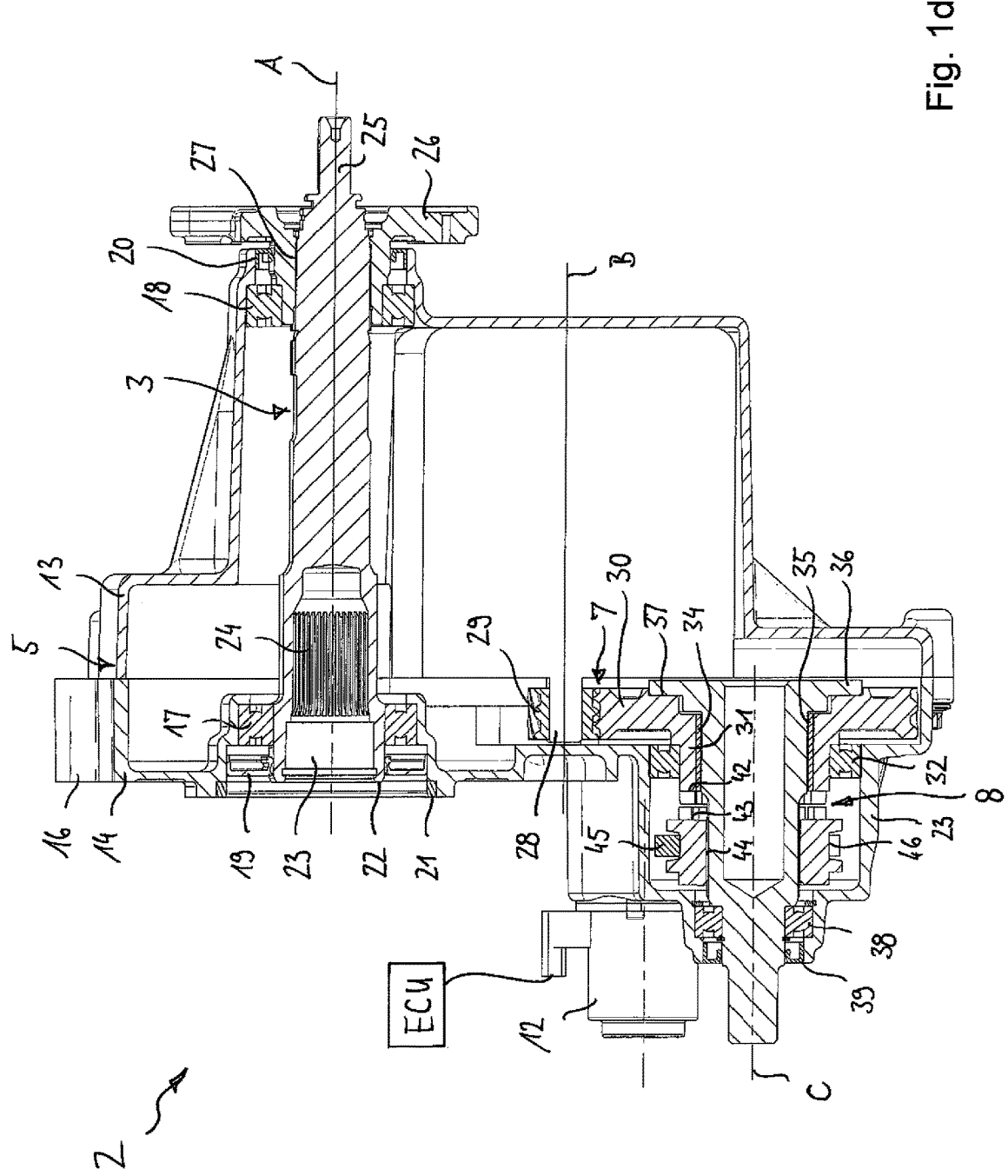
FIG. 1d shows the electric drive assembly of FIG. 1a in a longitudinal section through the axes of the through-drive, the electric machine and the driveshaft.

As is shown especially in FIGS. 1*b* to 1*c*, the electric drive assembly 2 comprises a torque supporting means 47, which means 47 supports the electric drive assembly 2 when operated at a stationary component, for example at the vehicle body. The torque supporting means 47 comprises a bushing 48 through which a bolt (not illustrated) or other supporting part being connected to the vehicle body can be inserted. In the mounted condition, the bushing 48 and the driveshaft 9 are arranged on different sides of a vertical plane which includes the axis of rotation A. In an axial view of the electric drive assembly 2, a longitudinal axis D of the bushing, the axis of rotation A of the through-driveshaft 3 and the axis of rotation C of the driveshaft 9 can be regarded as the corner points of a substantially isosceles triangle, with a first plane formed by the axis of rotation A of the through-driveshaft 3 and the axis of rotation C of the driveshaft 9, and a second plane formed by the axis of rotation A of the through-driveshaft 3 and the axis D of the bushing 48 enclosing an angle of approximately 90°+15°.

FIGS. 2 to 7 will initially be described jointly in respect of the characteristics they have in common. They each show a driveline assembly 49 of a motor vehicle 50 with a primarily driven rear axle 52 and an optionally driveable front axle 53. Of the primary (first) driveline 51, the longitudinally installed internal combustion engine 54, the main clutch 55, the multi-step transmission 56 with the output shaft 41, the through-drive 3, a rear propeller shaft 57 as well as the rear axle 52 are recognisable. The rear axle 52 comprises a rear axle differential 58 which transmits respectively splits the torque introduced by the propeller shaft 57 to the two sideshafts 59, 60 and the wheels 62, 63 connected thereto.

In addition, the driveline assembly 49 comprises a second driveline 64 for driving the front axle 53. The second driveline 64 comprises the electric drive 4 with the reduction gearing 7 and the coupling 8, a front propeller shaft 65 and the front axle 53 drivingly connected to the latter. The front axle 53 comprises a differential drive 61 which transmits respectively splits the introduced torque to the two front sideshafts 66, 67 and the wheels 68, 69 connected thereto.

The inventive driveline assembly 49 is characterised by the use of an inventive electric drive unit 2 which comprises the through-driveshaft 3 as part of the first driveline 51, as well as the electric drive 4 as part of the second driveline 64.

The housing 5 of the inventive electric drive assembly 2 is firmly connected to the housing of the multi-step transmission 56. By integrating the through-driveshaft 3 and the electric drive 4 into the electric drive assembly 2 to form one unit, a compact design is achieved, which allows the inventive unit 2 to be arranged in the region of the multi-step transmission.

The inventive driveline assembly 49 makes it possible to put into effect various operating modes. According to a first operating mode, the front axle 53 can be optionally driven by the electric drive 4 in addition to the primarily driven rear axle 52. This measure can be carried out, for example, when the motor vehicle is accelerated, or for supporting the main drive when the vehicle is driven with a small amount of torque, a mode of operation that can be referred to as "cruising." By additionally driving the front axle 53, the traction of the motor vehicle is improved, which leads to a higher degree of efficiency. According to a further operating mode, the electric drive 4 can be used on its own, i.e., with the main drive line 51 being disconnected, for the purpose of driving the motor vehicle. This operational mode can be used for example during "crawling," inner-city driving at low speeds, stop-and-go driving, or parking. According to yet a further operational mode, the electric machine 6 can be used as a generator, during which process the mechanical energy transmitted by the co-rotating front axle 53 is converted into electrical energy. Such an energy recovery can take place during braking for example, which, because of the greater braking effect in this mode of operation, is particularly effective.

Below, greater details will be given regarding the special features of the different embodiments according to FIGS. 2 to 7. The embodiment according to FIG. 2 comprises a diagrammatically illustrated electric drive assembly 2 according to FIG. 1. It shows the coupling 8 in the power path between the reduction gearing 7 and the driveshaft 9. The embodiment according to FIG. 3 largely corresponds to that shown in FIG. 2, so that, as far as their common features are concerned, reference is made to the above description. Identical or modified components have been given the same reference numbers as those shown in FIGS. 2 and 1 respectively. The only difference consists in that in the present embodiment according to FIG. 3 the coupling 8 is arranged in the power path between the electric machine 6 and the reduction gearing 7.

The embodiment according to FIG. 4 is a diagrammatic illustration of a driveline assembly 49 without a coupling. Otherwise, the embodiment to FIG. 4 corresponds to that shown in FIG. 2, so that, in that respect, reference can be made to the above description.

Figure 2:
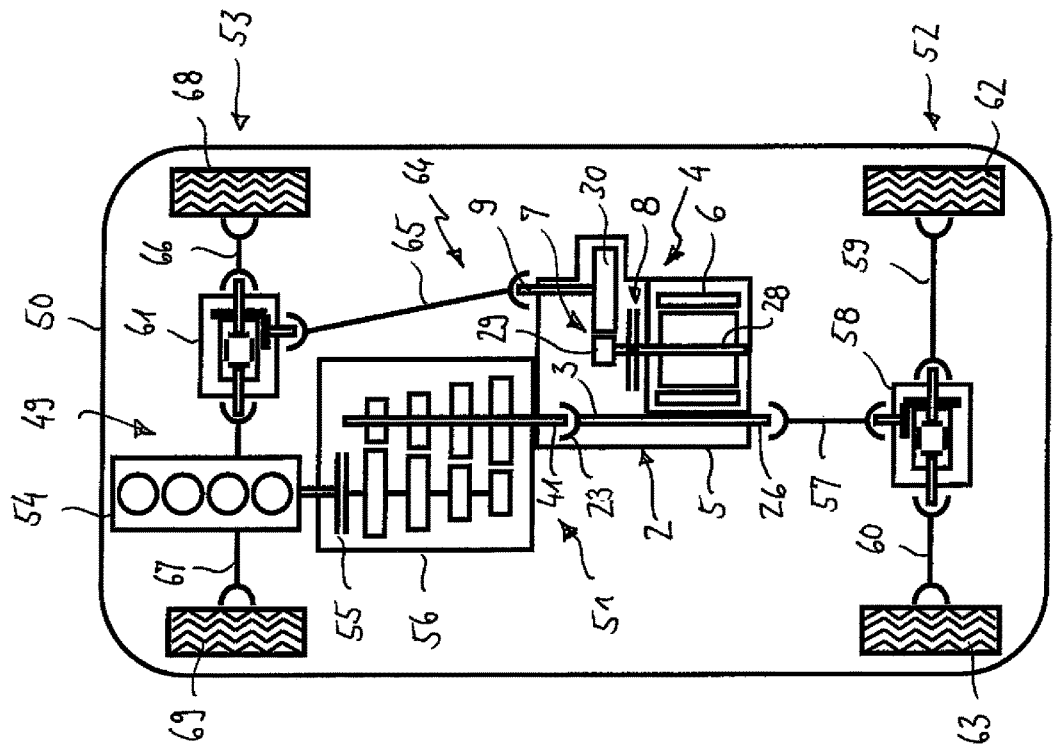
FIG. 2 is a diagrammatic view of a motor vehicle with an electric drive assembly according to FIGS. 1a-1d.

The driveline assembly 49 according to FIG. 5 largely corresponds to that shown in FIG. 2, so that, as far as their common features are concerned, reference is made to the above description, with identical or modified components having been given the same reference numbers. As in the case of the embodiments according to FIGS. 2-4, the present embodiment is again shown diagrammatically only, i.e., it is not true to scale. One of the specific features of the present embodiment according to FIG. 5 is that the output shaft 28 of the electric machine 6 points towards the rear axle 52. As in the case of the embodiment according to FIG. 2, the coupling 8 is arranged between the reduction gearing 7 and the driveshaft 9. A further difference consists in that the front axle differential 61 is offset towards the left relative to the internal combustion engine 54. However, it is understood that this is an arbitrary arrangement, with the actual arrangement depending on the vehicle architecture.

Figure 3:
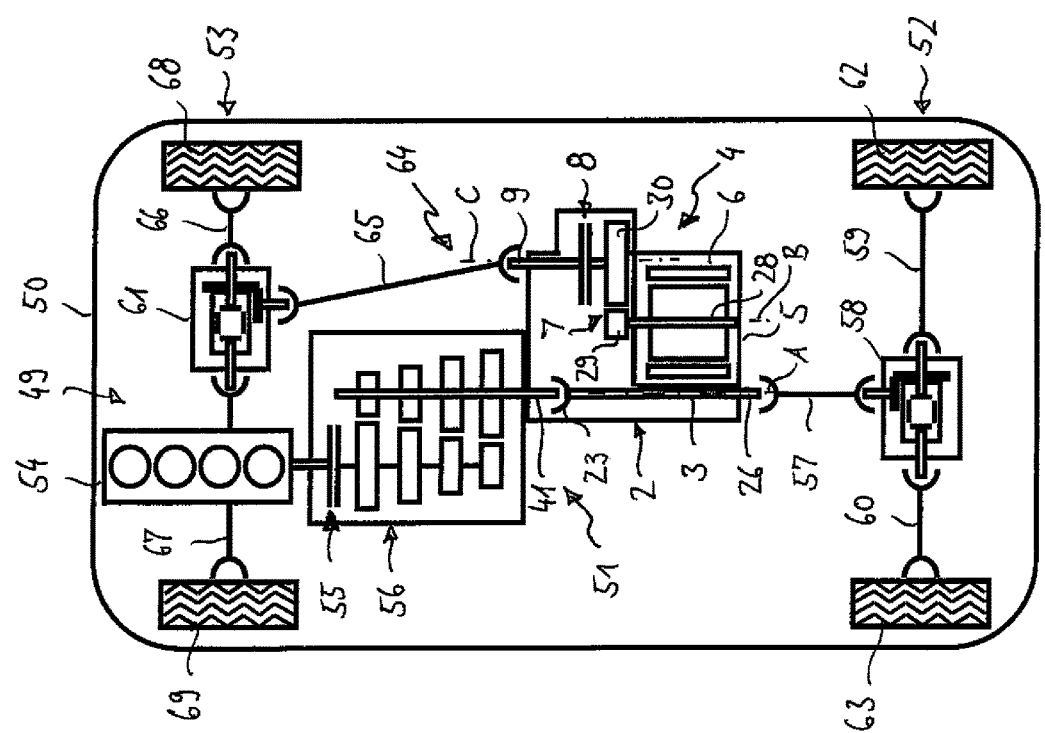
FIG. 3 is a diagrammatic view of a motor vehicle with an electric drive assembly in a second embodiment.
Figures 6, 7:
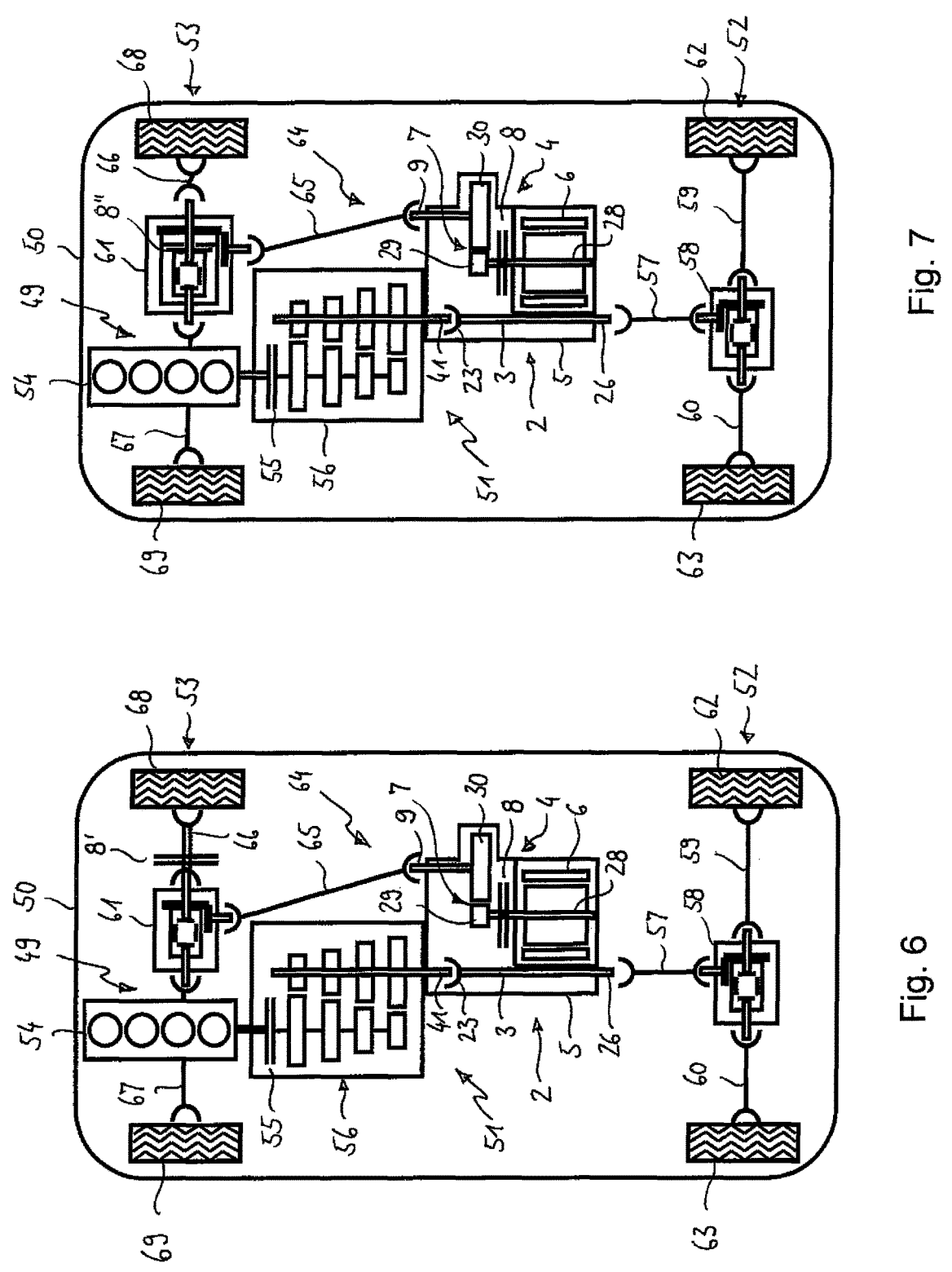

The driveline assembly 49 according to FIG. 6 largely corresponds to that shown in FIG. 3, so that as far as their common features are concerned, reference can be made to the above description. Identical or modified components have been given the same reference numbers as in FIG. 3. A special characteristic of the present embodiment according to FIG. 6 is that, a further coupling 8' is provided in the front driveline 64, in addition to the coupling 8 in the electric drive assembly 2. Said further coupling 8' is arranged in the power path between the front axle differential 61 and one of the wheels 68, preferably in the attachment region of the respective sideshaft 66. It is understood that the present embodiment could also be modified to the extent that the coupling 8 in the electric drive assembly 2 can be eliminated, i.e. only the coupling 8' in the front axle 53 would be used. Furthermore, it is conceivable that in the second sideshaft 67, too, there could be provided a respective coupling, in addition to or as an alternative to the coupling 8' arranged in the region of the first sideshaft 66. Arranging at least one coupling in the power path between the wheels 68, 69 and the front axle differential 61 is advantageous in that, when the coupling is open, a rotational movement of the differential carrier and of the rotating parts received therein can be interrupted. In an advantageous way, this leads to lower friction losses within the driveline.

The driveline assembly according to FIG. 7 largely correspond to that shown in FIG. 6, so that as far as common features are concerned, reference can be made to the above description. Identical or modified components have been given the same reference numbers as those mentioned in FIG. 6. A special feature of the present embodiment is that the coupling 8" is arranged in the power path between the input part and the two output parts of the differential 61. As an example of such a disconnection integrated into the front axle differential 61, the coupling 8" can be arranged between the crown gear and the differential carrier.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An electric drive assembly for a multi-axle driven motor vehicle that comprises a first driveline with an internal combustion engine, a multi-step transmission and a rear propeller shaft for driving a rear axle, and a second driveline with a front propeller shaft for driving an optionally drivable front axle, said electric drive assembly comprising:

an electric machine for driving the front axle;
a reduction gearing drivingly connected to the electric machine;
a driveshaft that is drivingly connected to the reduction gearing and that is connectable to the front propeller shaft for driving the front axle; and
a housing in which the electric machine and the reduction gearing are arranged, wherein the housing comprises at least one connection element arranged to connect the housing to the multi-step transmission,
wherein the electric drive assembly further comprises a through-driveshaft to transmit torque through the housing, the through-driveshaft being supported in the housing so as to be rotatable around an axis of rotation (A) and comprising an input part for being drivingly connected to an output shaft of the multi-step transmission as well as an output part for being drivingly connected to the rear propeller shaft such that, with the electric drive assembly mounted at the multi-step transmission, the rear propeller shaft is connectable at least indirectly to the output shaft of the multi-step transmission so as to be drivable by the internal combustion engine for driving the rear axle, and
wherein the electric machine, the reduction gearing and the driveshaft of the electric drive assembly form part of the second driveline and are configured to be mechanically separate from the first driveline, so that, of the front axle and the rear axle, the front axle is drivable by the electric machine, and the rear axle is drivable by the internal combustion engine.

2. The electric drive assembly of claim 1, wherein a longitudinal axis (B) of the electric machine is arranged at a distance from the axis of rotation (A) of the through-driveshaft, wherein an angle enclosed between said longitudinal axis (B) and said axis of rotation (A) of the through-driveshaft is smaller than 10 degrees.

3. The electric drive assembly of claim 2, wherein the longitudinal axis (B) of the electric machine is arranged at a distance from an axis of rotation (C) of the driveshaft, wherein an angle enclosed between the longitudinal axis (B) and said axis of rotation (C) of the driveshaft is smaller than 10 degrees.

4. The electric drive assembly of claim 1, wherein a coupling is arranged in a power path between the electric machine and the driveshaft, which coupling is operable to selectively effect and interrupt torque transmission between the electric machine and the driveshaft.

5. The electric drive assembly of claim 4, wherein the coupling comprises a first coupling part that is connected in rotationally fixed manner to an output part of the reduction gearing, and a second coupling part that is connected in rotationally fixed manner to the driveshaft, wherein the first and the second coupling parts are selectively engagable and disengagable.

6. The electric drive assembly of claim 4, wherein an actuator is provided for actuating the coupling, which actuator is actuated one of electro-mechanically and electro-magnetically.

7. The electric drive assembly of claim 1, wherein the reduction gearing is a single-step cylinder gearing and comprises a reduction ratio of four to six.

8. The electric drive assembly of claim 1, wherein the through-driveshaft, in a region of the input part, is rotatably supported by a first bearing and, in a region of the output part is rotatably supported by a second bearing, wherein at least one of the first and second bearing is arranged so as to be axially offset away from an end face of the electric machine.

9. The electric drive assembly of claim 1, wherein the electric machine comprises a nominal voltage of 60 Volts maximum.

10. The electric drive assembly of claim 1, wherein the housing comprises a torque support mechanism.

11. A multi-axle driven motor vehicle, having a first driveline with a rear propeller shaft for driving a rear axle, a second driveline with a front propeller shaft for driving a front axle, a longitudinally mounted internal combustion engine and a multi-step transmission drivingly connected to the internal combustion engine for driving only the first driveline and an electric drive assembly for driving only the second driveline, the electric drive assembly comprising:
an electric machine;
a reduction gearing drivingly connected to the electric machine;
a driveshaft that is drivingly connected to the reduction gearing and that is connectable to a front propeller shaft for driving the front axle; and
a housing in which the electric machine and the reduction gearing are arranged, wherein the housing comprises at least one connection element arranged to connect the housing to the multi-step transmission,
wherein the electric drive assembly is configured such that, with the electric drive assembly mounted at the multi-step transmission, a rear propeller shaft is connectable at least indirectly to the output shaft of the multi-step transmission for driving the rear axle; and
further wherein the housing of the electric drive assembly is securely connected to a housing of the multi-step transmission via the at least one connection element, wherein the rear propeller shaft is at least indirectly drivingly connected to the output shaft of the multi-step transmission so as to pass through the housing, and
the driveshaft of the electric drive assembly is drivingly connected to the front axle via the front propeller shaft, wherein the first driveline and the second driveline are mechanically separate from each other such that, of the rear axle and the front axle, the rear axle is drivable by the internal combustion engine and the front axle is drivable by the electric machine.

12. The motor vehicle of claim 11, wherein the electric drive assembly comprises a through-driveshaft for transmitting torque through the housing, wherein an input part of the through-driveshaft is connected to the output shaft of the multi-step transmission and wherein an output part of the through-driveshaft is connected to the rear propeller shaft.

13. The motor vehicle of claim 11, wherein the front axle comprises a front-axle differential and two sideshafts arranged to drive front wheels, wherein the front axle differential distributes a torque introduced by the front propeller shaft to the two sideshafts, wherein a coupling is arranged in the power path between the driveshaft of the electric drive assembly and the two front wheels.

14. The motor vehicle of claim 11, wherein the electric machine is integrated into an on-board power supply of the motor vehicle.

* * * * *